Figure 1:
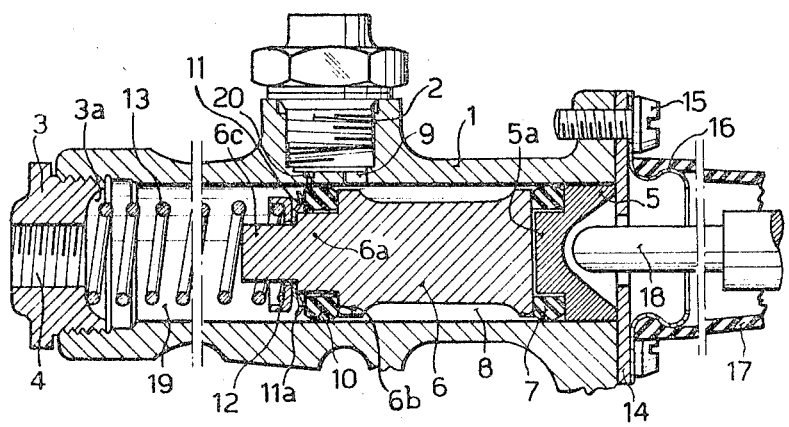

Jan. 31, 1967    P. S. BALDWIN    3,300,973
MASTER CYLINDER
Filed July 12, 1965    2 Sheets-Sheet 1

Jan. 31, 1967   P. S. BALDWIN   3,300,973
MASTER CYLINDER
Filed July 12, 1965
2 Sheets-Sheet 2
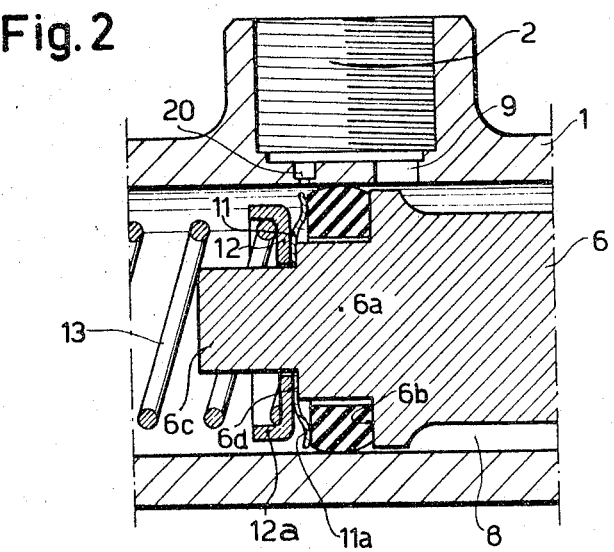
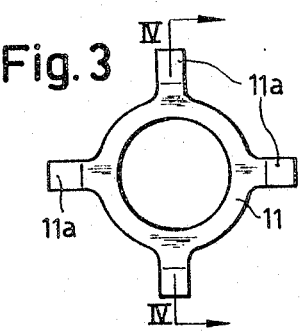
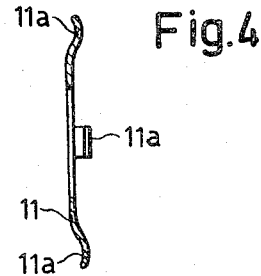
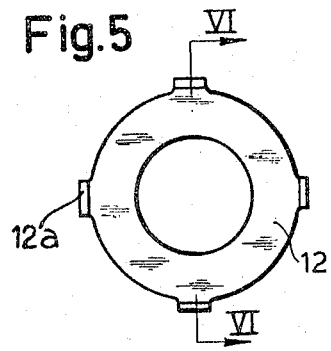
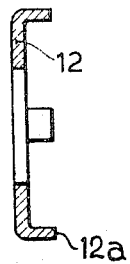
INVENTOR
BY
ATTORNEY 3,300,973
MASTER CYLINDER
Philip Sidney Baldwin, Florence, Italy, assignor of one-half to Fiat Società per Azioni, Turin, Italy
Filed July 12, 1965, Ser. No. 471,104
Claims priority, application Italy, July 22, 1964, 16,385/64
2 Claims. (Cl. 60—54.6)

This invention relates to an improvement in master cylinders, more particularly for hydraulic brake mechanisms on motor vehicles.

Master cylinders are known which are provided with a reservoir containing a liquid, preferably oil, and with a piston being movable in the cylinder and being actuated by a pedal through leverages and a push rod. The piston head carries a resilient sealing member which seals against the inner cylinder wall and prevents flow of liquid to the reservoir during the operative stroke of the piston.

Master cylinders of this type comprise valves which serve to cut off connection of the cylinder chamber connected with the utilizer circuits and the reservoir during the operative piston stroke, and to re-establish this connection during the return stroke of the piston.

Master cylinders of the type referred to above are further known in which the valve comprises the sealing member which seals between the piston and the inner cylinder wall. In this case the sealing member is in the form of a ring received with an axial and radial clearance by a circumferential groove in the piston head. The groove bottom is connected through radial holes with a front opening cut in the piston head, the sealing member being in cross section of a substantially rectangular shape, the outer side of the rectangle being arcuated in order to reduce the contact surface of the sealing member and the inner cylinder wall.

During the operative piston stroke the annular sealing member is moved towards the radial abutment on the groove, which is situated opposite the cylinder chamber connected with the utilizer circuits, thereby shutting off the chamber. During the return stroke of the piston the sealing member is moved towards the opposite abutment on the annular groove thereby connecting the cylinder chamber communicating with the utilizer circuits with the reservoir through the front opening and radial holes in the piston head.

Finally, master cylinders are known, wherein one abutment on the circumferential groove cut in the piston head, receiving the ring acting as a sealing member and valve, is in the form of a pressed sheet metal dished member secured to the end of the spring which opposes the operative or compression stroke of the piston.

In the latter case it becomes superfluous to connect the groove bottom receiving the ring-sealing member-valve unit with the compression chamber in the cylinder through radial holes and a middle axial opening cut in the piston head.

It has been found that in most of cylinders of the abovementioned type a drawback can arise in certain operating conditions, residing in the fact that during the operative stroke of the piston against the action of its respective opposing spring, a liquid volume can overflow from the master cylinder to the reservoir, which is larger than the volume drawn into the reservoir and transferred to the compression chamber during the return stroke of the piston, which results in a possibly considerable extension of the operative or compression stroke of the piston.

This invention removes the abovementioned drawback by adopting a master cylinder of the type in which the radial abutment defining the annular groove receiving the ring/seal unit, situated on the side of the compression chamber, comprises a pressed dished member, and by interposing between the dished member and annular seal resilient means which act on the sealing member by pushing it towards the other radial abutment which defines the groove receiving the ring/sealing member unit on the opposite side of the dished member.

With this structure the ring-sealing unit safely moves at the end of the return stroke of the piston towards the radial shoulder defining the groove by which it is accommodated on the opposite side to the compression chamber, thereby cutting off the communication between the reservoir and compression chamber through the annular clearance provided between the outer periphery of the piston head and inner cylinder wall already before start of the operative or compression stroke of the piston.

Further characteristic features and advantages of this invention will be clearly understood from the appended description which is given by way of example, with reference to the accompanying drawings which show embodiments thereof. On the drawings FIGURE 1 is a longitudinal sectional view of a master cylinder according to this invention, FIGURE 2 is a longitudinal sectional view showing on an enlarged scale diagrammatically the arrangement of the main components of the master cylinder according to FIG. 1 at the end of the return stroke of the piston, FIGURE 3 is a front view of the resilient member interposed between the pressed dished member and annular sealing member provided in the piston head, FIGURE 4 is a sectional view on line IV—IV of FIG. 3, FIGURE 5 is a front view of the pressed dished member carried by the piston head, FIGURE 6 is a sectional view on line VI—VI of FIG. 5.

The master cylinder shown on the drawings comprises a cylinder 1 connecting at the top through a nipple 2 with a conventional reservoir (not shown).

The inner hollow in the cylinder 1 is closed at one end by a screw threaded plug 3. The through axial hole 4 in the latter connects with a pipe (not shown) leading to the cylinders operating the friction elements of the wheel brakes on the vehicle equipped with the master cylinder.

The cylinder 1 has slidably mounted therein a piston composed of a thrust member 5 and a main member 6. The thrust member 5 matches in outer diameter substantially the inner diameter of the cylinder. The thrust member 5 is formed on its near side to the member 6 with a cylindrical extension 5a reduced in diameter having slipped thereon with a radial clearance an annular sealing member 7 the axial size of which exceeds the length of the said cylindrical extension 5a.

The main member 6 of the piston is shaped to leave between its middle portion and inner wall of the cylinder 1 an annular chamber 8. The latter permanently connects through a hole 9 with the nipple 2.

The member 6 is formed at its end facing the plug 3 with an axial cylindrical extension 6a extending beyond a radial annular wall 6b. The extension 6a is formed still at its end facing the plug 3 with an axial extension 6c which is likewise cylindrical and has its periphery separate from the periphery of the extension 6a by a radial annular wall 6b coaxial with the member 6. The cylindrical extension 6a has slipped thereon a ring 10 of plastic, preferably rubber. This ring is substantially rectangular in cross sectional shape, its outer wall being slightly arcuated in profile in order to reduce the contact surface with the inner wall of the cylinder 1. The ring 10 is moreover of a bore such that it can be assembled on the cylindrical extension 6a with a radial clearance, and is smaller in axial size than the extension 6a. The face of the ring 10 remote from the radial wall 6b is abutted by radial sprung projections 11a on a disc 11 slipped on the extension 6c and held against the radial wall 6d by a dished member of pressed sheet metal 12, which is likewise slipped on the extension 6c on the cylindrical extension 6a on the main member 6 of the piston.

The dished member 12 carrying the axial projections 12a is rolled on one end of the opposing spring 13, the other end of which is centered in a seat 3a provided in the plug 3.

The cylinder 1 is closed at its other end with respect to the plug 3 by an annular washer 14 secured to a radial flange on the cylinder by means of screws 15 and acting as a stop member for the member 5 of the piston to prevent the piston 5, 6 from moving out of the cylinder 1 under the action of the spring 13. The screws 15 attaching the washer 14 to the cylinder 1 further secure to the cylinder a pressed sheet metal shaped member acting as a retaining means for the rubber cap 17 surrounding the end of the push rod 18 connected to the brake pedal through leverages (not shown).

The above described master cylinder operates as follows.

In the inoperative position shown in FIGURES 1 and 2 the piston 5, 6 is pressed by the spring 13 against the washer 14. The annular sealing member 10 is in turn held adjacent to the radial wall 6b by the action of the radial projections 11a on the annular disc 11. Under these conditions the compression chamber 19 connects with the inside of the nipple 2 leading to the reservoir through the compensation hole 20. This communication is cut off right after start of the braking action, namely, when the piston 5, 6 has moved forward by a very slight extent, sufficient to displace the top of the sealing member 10 to the other side of the compensation hole 20. On completion of braking the piston is returned to its starting position by the action of the spring 13. At this stage a relative displacement of the ring 10 and cylindrical extension 6a ocurs. This displacement is effected against the resilient action of the radial projections 11a on the annular disc 11, thereby removing the ring 10 from the radial wall 6b, and opening the communication between the compression chamber 19 and reservoir through the radial clearance provided between the circumference of the wall 6b on the piston and the inner wall of the cylinder 1, whereby liquid can overflow from the reservoir to the compression chamber. This communication is readily intercepted as the piston is stopped by the thrust constantly exerted on the ring 10 by the radial sprung projection 11a on the annular disc 11.

It will be understood that, the principle of the invention being left unaltered, the embodiments can be widely varied with respect to the example described and shown without departing from the scope of this invention as defined by the appended claims.

What I claim is:

1. A master cylinder for a hydraulic brake system of a motor vehicle, the master cylinder having a fluid supply port in a wall of the cylinder in communication with a source of hydraulic fluid supply, a compression chamber in the cylinder, a piston slidable within the cylinder having sufficient clearance with the cylinder wall to permit ready passage of fluid between the piston and the cylinder, an axial cylindrical extension of lesser diameter than the piston on an end of the piston adjacent the compression chamber with a shoulder forming a radial wall between the extension and the remaining portion of the piston, a resilient combination valve and sealing ring carried by the cylindrical extension of the piston with radial clearance therebetween, the ring contacting the cylinder wall to seal the piston between the compression chamber and fluid supply port and control flow through the fluid supply port in the cylinder wall on a compression stroke of the piston, a dished member carried by the piston on a second reduced diameter extension outwardly of the cylindrical extension, a piston return spring biasing the dished member toward the cylindrical extension while leaving an axial space between the dished member and the ring when the ring is against the radial wall, the improvement comprising a resilient member interposed in the axial space between the dished member and resilient ring biasing the resilient ring against the radial wall.

2. A master cylinder as defined in claim 1 wherein the resilient member comprises an annular disc with sprung radial projections.

No references cited.

MARTIN P. SCHWADRON, *Primary Examiner.*

R. R. BUNEVICH, *Assistant Examiner.*